United States Patent
Lavigne et al.

(10) Patent No.: US 11,327,694 B2
(45) Date of Patent: *May 10, 2022

(54) PRINT SUBSTANCE END-OF-LIFE PREDICTIONS

(71) Applicant: Hewlett-Packard Development Company, L.P., Spring, TX (US)

(72) Inventors: Mathew Lavigne, Boise, ID (US); Jeffrey Luke, Boise, ID (US); Sean Daniel Fitzgerald, Boise, ID (US); Dean Richtsmeier, Boise, ID (US); Kenneth Smith, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,327

(22) Filed: May 21, 2021

(65) Prior Publication Data

US 2021/0279017 A1 Sep. 9, 2021

Related U.S. Application Data

(63) Continuation of application No. 16/635,368, filed as application No. PCT/US2018/016128 on Jan. 31, 2018, now Pat. No. 11,055,038.

(51) Int. Cl.
| | |
|---|---|
| *G06F 3/12* | (2006.01) |
| *G03G 15/08* | (2006.01) |
| *H04N 1/00* | (2006.01) |
| *B41J 2/175* | (2006.01) |

(52) U.S. Cl.
CPC .......... *G06F 3/1235* (2013.01); *G06F 3/1203* (2013.01); *B41J 2/17509* (2013.01); *G03G 15/0865* (2013.01); *H04N 1/00002* (2013.01); *H04N 1/0035* (2013.01); *H04N 1/00832* (2013.01)

(58) Field of Classification Search
None
See application file for complete search history.

(56) References Cited

U.S. PATENT DOCUMENTS

| | | | |
|---|---|---|---|
| 3,761,953 A | 9/1973 | Helgeson et al. | |
| 4,968,998 A | 11/1990 | Allen | |
| 5,631,681 A | 5/1997 | Klaus et al. | |
| 5,777,648 A | 7/1998 | Scheffelin et al. | |
| 5,963,238 A | 10/1999 | Scheffelin et al. | |
| 5,992,985 A | 11/1999 | Young et al. | |

(Continued)

FOREIGN PATENT DOCUMENTS

| | | |
|---|---|---|
| CN | 102016784 A | 4/2011 |
| CN | 105793812 A | 7/2016 |

(Continued)

*Primary Examiner* — Miya J Williams
(74) *Attorney, Agent, or Firm* — Jefferson IP Law, LLP (57) ABSTRACT

An example device capable of predicting print substance end-of-life (EOL) comprises a container to hold a print substance, the container comprising a refill port through which print substance is to be introduced into the container. The example device also comprises a processor to receive signals indicative of an amount of print substance introduced via the refill port. The processor is also to predict a print substance end-of-life (EOL) based on the amount of print substance introduced.

20 Claims, 3 Drawing Sheets

(56) References Cited

U.S. PATENT DOCUMENTS

| | | |
|---|---|---|
| 5,995,774 A | 11/1999 | Applegate et al. |
| 6,036,296 A | 3/2000 | Axtell et al. |
| 6,065,824 A | 5/2000 | Bullock et al. |
| 6,076,913 A | 6/2000 | Garcia et al. |
| 6,106,089 A | 8/2000 | Wen et al. |
| 6,155,664 A | 12/2000 | Cook |
| 6,158,849 A | 12/2000 | Veciana et al. |
| 6,227,638 B1 | 5/2001 | Childers et al. |
| 6,238,033 B1 | 5/2001 | Silverbrook |
| 6,283,586 B1 | 9/2001 | Childers |
| 6,301,460 B1 | 10/2001 | Elliot |
| 6,302,527 B1 | 10/2001 | Walker |
| 6,402,306 B1 | 6/2002 | Childers et al. |
| 6,676,252 B2 | 1/2004 | Bilotta et al. |
| 6,729,360 B2 | 5/2004 | Sesek et al. |
| 6,789,864 B2 | 9/2004 | Phillips |
| 6,935,713 B2 | 8/2005 | Phillips |
| 7,029,083 B2 | 4/2006 | Merz et al. |
| 7,114,801 B2 | 10/2006 | Hall et al. |
| 7,431,411 B2 | 10/2008 | Brenner |
| 7,607,748 B2 | 10/2009 | Nishizaka et al. |
| 7,702,419 B2 | 4/2010 | Kinalski et al. |
| 8,025,380 B2 | 9/2011 | Silverbrook |
| 8,494,379 B2 | 7/2013 | Kim |
| 8,734,034 B2 | 5/2014 | Morovic et al. |
| 9,104,174 B2 | 8/2015 | Burchette |
| 9,110,423 B1 | 8/2015 | Bartle |
| 10,375,273 B1 | 8/2019 | Bush et al. |
| 11,055,038 B2 * | 7/2021 | Lavigne ............... B41J 2/17546 |
| 2001/0043256 A1 | 11/2001 | Seccombe et al. |
| 2002/0042747 A1 | 4/2002 | Istvan |
| 2003/0030683 A1 | 2/2003 | Nojima |
| 2003/0227496 A1 * | 12/2003 | Ebisawa ............... B41J 2/17566 |
| | | 347/7 |
| 2004/0032442 A1 * | 2/2004 | Phillips ............... B41J 2/17506 |
| | | 347/19 |
| 2004/0090493 A1 * | 5/2004 | Silverbrook .......... B41J 2/1623 |
| | | 347/54 |
| 2005/0110815 A1 | 5/2005 | Merz et al. |
| 2005/0219284 A1 | 10/2005 | Shima |
| 2005/0251480 A1 | 11/2005 | Lyman |
| 2006/0083522 A1 | 4/2006 | Frankel et al. |
| 2008/0259112 A1 | 10/2008 | Olsen et al. |
| 2009/0153602 A1 | 6/2009 | Brown et al. |
| 2009/0278872 A1 | 11/2009 | Turgeman |
| 2010/0207999 A1 | 8/2010 | Silverbrook et al. |
| 2011/0211850 A1 | 9/2011 | Kim |
| 2012/0050417 A1 | 3/2012 | Olsen et al. |
| 2013/0101328 A1 | 4/2013 | Morovic et al. |
| 2014/0376931 A1 * | 12/2014 | Thacker ............... G03G 15/5079 |
| | | 399/12 |
| 2016/0132012 A1 | 5/2016 | Swantner et al. |
| 2017/0015105 A1 | 1/2017 | Kuwahara et al. |
| 2017/0289370 A1 | 10/2017 | Abe |
| 2019/0299624 A1 | 10/2019 | Mizutani et al. |
| 2019/0320078 A1 | 10/2019 | Foley et al. |
| 2020/0369441 A1 | 11/2020 | Luke et al. |
| 2020/0398578 A1 | 12/2020 | Luke et al. |
| 2020/0398579 A1 * | 12/2020 | Gardner ............... B33Y 50/00 |
| 2021/0063912 A1 | 3/2021 | Mcdaniel et al. |
| 2021/0080863 A1 | 3/2021 | Hong et al. |
| 2021/0088939 A1 | 3/2021 | Lee et al. |
| 2021/0116841 A1 | 4/2021 | Lavigne et al. |

FOREIGN PATENT DOCUMENTS

| | | |
|---|---|---|
| EP | 1 745 932 A1 | 1/2007 |
| EP | 3 182 272 A1 | 6/2017 |
| EP | 3 182 689 A1 | 6/2017 |
| JP | 2017174035 A | 9/2017 |

* cited by examiner

PRINT SUBSTANCE END-OF-LIFE PREDICTIONS

BACKGROUND

At times, devices may apply print substance to a substrate to form markings, including images and text. The devices may store print substance in containers. Predictions may be made of print substance end-of-life (EOL) for a particular container.

BRIEF DESCRIPTION OF THE DRAWINGS

Various examples will be described below by referring to the following figures.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

Marking substrates, such as paper, with images and text may be performed in a number of ways. For instance, different forms of print substances, such as fluid print substances, solid print substances, and print substances comprising combinations of fluids and solids may be used to form markings on substrates in different ways. Similarly, additive manufacturing processes, such as 3-D printing, may comprise the layering of particles and/or binding agents of different materials on an initial substrate or platform. For example, a print substance may be applied directly to a substrate or indirectly to a substrate. To illustrate, a fluid print substance may be applied directly to a substrate by ejecting drops of print substance to the substrate. In another example, a print substance comprising solids may be arranged on an application member in a desired pattern and subsequently transferred from the application member to the print substrate. It is to be understood that these are non-limiting examples of possible methods of marking substrates using example print substances, and other methods are contemplated by claimed subject matter.

It should be understood, therefore, that a number of different print substances, such as print fluids (e.g., inks), print solids (e.g., toners), and additive materials by way of non-limiting example, may be applied to a print substrate to form markings thereon in a number of different ways. Print substances of different types may be stored in containers and conveyed towards an appropriate application mechanism (e.g., for application to a substrate), such as via a print head or a developer unit/transfer unit, by way of non-limiting example. It is noted that in some implementations, containers for storing print substance may include an integrated and/or a separate application mechanism. For instance, some electrophotographic (EP) print devices may use containers that include an integrated development unit, while others may use distinct containers, development units, transfer units, etc. In some fluid print substance print devices, containers may comprise an integrated print head and/or a print head distinct from a fluid print substance container.

Whatever the form of the print substance or the method of marking a substrate, there may be a desire to estimate whether sufficient print substance is available, such as within a container, to complete a requested print job. More generally, there may be an interest in determining (e.g., predicting or estimating) a number of pages printable by a print device. In some implementations, for instance, predictions may be made as to print substance end-of-life (EOL) such as in the form of estimations as to a number of pages printable based on amounts of print substance that may be available within a cartridge, estimations of a number of dots or pixels printable per unit (e.g., grams) of print substance, a measure of volume in the case of additive material-based printing (e.g., a number of voxels producible per unit of additive material), etc. Such estimations may be useful to avoid commencing a print job (e.g., an impression of a number of pages) with insufficient print substance to complete the job. Indeed, print jobs started with insufficient levels of print substance may result in lower quality, user frustration and dissatisfaction, by way of example.

At times, containers may be refilled with print substance. Predicting print substance EOL, such as in the form of estimating a number of pages printable, may present certain challenges after print substance refills. For example, a print substance introduced during refill may have different characteristics (e.g., amount, mass, yield, charge properties, transfer properties, fusing or melting properties, durability or reliability, volatile chemical content, particle size distribution, etc.) than a print substance originally present in a container (e.g., original print substance as opposed to refill print substance). Additionally, determining an amount of print substance introduced during refill, such as in units of mass or volume, may not be directly measurable electronically. As such, there may be a desire for a method for predicting print substance EOL, such as comprising a determination of a number of pages printable, even in cases in which refill print substance has been introduced to a container.

Some methods for predicting print substance EOL after print substance refill may include using an amount of print substance introduced via refill to determine an amount of output a printing device is able to produce, such as a number of pages, pixels, and/or voxels that will be printable. A number of implementations capable of making such a determination are discussed hereinafter.

Figure 1:
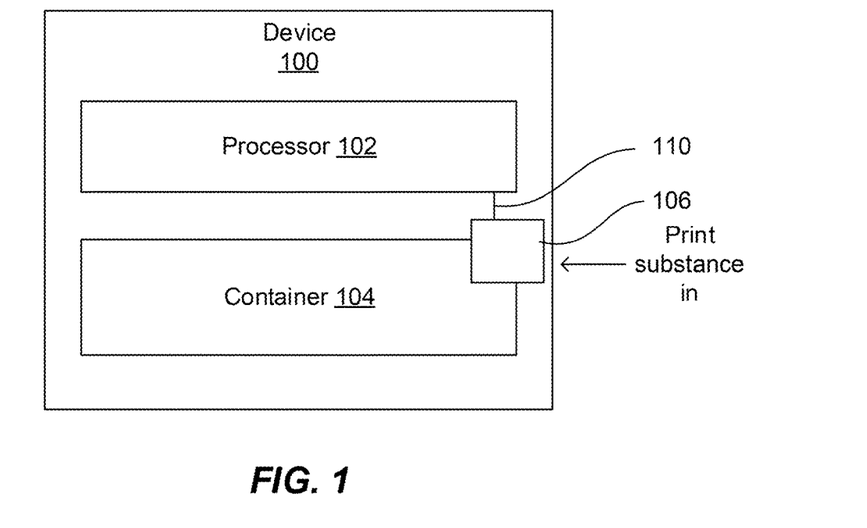
FIG. 1 is a block diagram of an example device.

FIG. 1, for instance, illustrates an implementation comprising a device 100 capable of making print substance EOL predictions. One such example device 100 may comprise a processor 102 and a container 104 (e.g., for storing a print substance). Processor 102 refers to a component (or a plurality of components) capable of executing instructions and performing logical operations. Processor 102 may comprise a general processing unit or a special processing unit, such as an application-specific integrated circuit (ASIC), and capable of executing instructions to enable prediction of print substance EOL. Container 104 may comprise a refill port 106. Print substance may be introduced during refill via refill port 106 (and print substance may be conveyed out of container 104 via conveyance port (not shown in FIG. 1; see conveyance port 308 in FIG. 3)). It is noted that though refill port 106 is illustrated by a block that is independent from the block representing container 104, refill port 106 is not necessarily distinct from container 104. Indeed, in some implementations, refill port 106 may be integrated within container 104. In another case, refill port 106 may comprise an opening in a wall structure of container 104.

In some implementations, there may be a connection 110 (e.g., an electrical connection, an optical connection, etc.) that may enable an exchange of signals between container 104 and/or refill port 106 and processor 102. There may be a desire, for instance, to communicate signals indicative of an amount of print substance introduced via refill port 106 to processor 102, such as to enable predictions of print substance EOL (e.g., a number of pages printable) for device 100.

Example device 100 may comprise a container (e.g., container 104) to hold a print substance, the container comprising a refill port (e.g., refill port 106) through which print substance is to be introduced into the container (see e.g., the arrow in FIG. 1) And there may be a desire to predict print substance EOL, such as after introduction of print substance into container 104. Such print substance EOL predictions may be accomplished using a processor (e.g., processor 102) to receive signals indicative of an amount of print substance introduced via the refill port, and predict a print substance EOL based on an amount of print substance introduced.

Figure 2:
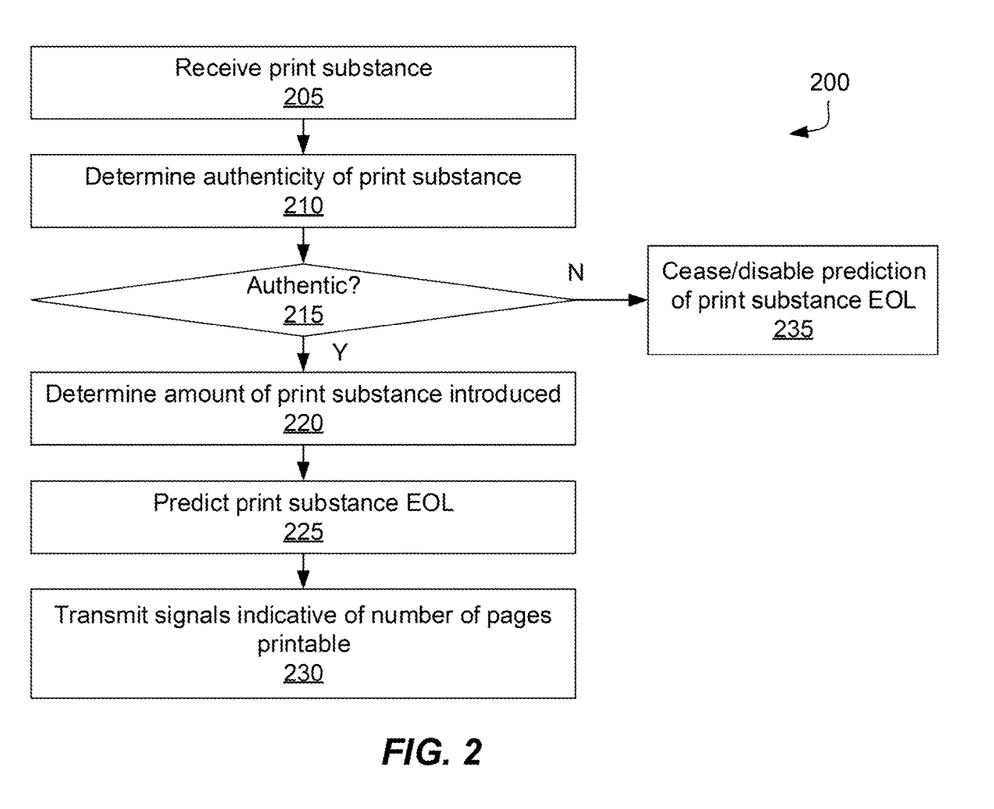
FIG. 2 is a flowchart for an example method for predicting print substance end-of-life (EOL)

FIG. 2 illustrates an example method 200 for predicting a print substance EOL based on an amount of print substance introduced via refill. Reference is made to elements of FIG. 1 to illustrate one implementation of example method 200. The following discussion is not to be taken in a limiting sense.

As illustrated at block 205, example method 200 may include receiving, via a refill port (e.g., refill port 106 of device 100 in FIG. 1) of a container (e.g., container 104), a print substance. In some examples, for example, a refill container holding refill print substance may introduce print substance into container 104 via refill port 106. If a refill container comprises a bottle of refill print substance, the bottle may connect to a refill interface of device 100 (not shown in FIG. 1; see refill interface 320 in FIG. 3) to introduce additional print substance into container 104 (e.g., refilling). The introduced refill print substance may be added to remaining (e.g., original) print substance in container 104.

As illustrated at block 210 of example method 200, the device (device 100) may determine, using a processor (e.g., processor 102 of FIG. 1), whether the received print substance comprises an authenticated print substance. As referred to herein, an authenticated print substance is of a verified and/or authorized source. For example, circuitry (e.g., a memory, a processor, etc.) may be included on a refill container and may store signals or states indicative of a source of the refill container (e.g., within a serial number) and may be used in order to authenticate the refill container and any print substance contained therein. In another example case, a refill container may include identifier markings (e.g., an ID number, a serial number, bar-code, a QR code, etc.) that may be entered into a user interface (UI) of the device to authenticate print substance contained therein. In another case, a physical feature of a refill container (e.g., a particular opening shape or feature thereof) that may be used to authenticate a print substance contained therein. In some implementations, authentication may be performed by processor 102 (e.g., in response to execution of computer executable instructions) based on signals received related to an identity of a refill print substance container and/or refill print substance contained therein.

At block 215 a decision is made in response to the determination of block 210. For example, in response to a determination that print substances received at block 205 are not authenticated, example device 100 may cease to predict print substance EOL, such as illustrated by block 235 of FIG. 2. For example, device 100 may cease to predict a number of pages printable because, for instance, device 100 may not be able to confirm print substance characteristics to enable predictions of print substance EOL with acceptable levels of accuracy. Furthermore, there may be a concern that non-authenticated print substances may lead to unsatisfactory print quality, damage to a developer system, or other potentially undesirable results. Device 100 may provide warnings informing users of the lack of print substance EOL predictions, and potential consequences thereof. For example, if a user sends a print job to device 100, a warning may be displayed to inform the user that device 100 may not have sufficient print substance to complete the print job. Etc.

If, on the other hand, a print substance is determined to be authentic, such as illustrated by block 210, example method 200 may advance to block 220. In some examples, as illustrated at block 220 a determination may be made of an amount of print substance that has been introduced. An amount of print substance introduced may be in terms of mass (e.g., grams) or volume (e.g., milliliters (ml)). In some implementations, an amount of print substance introduced, such as to container 104 of FIG. 1, may be determined based on an identification feature of a print substance refill container. For example, an example print substance refill container may have a mechanical mechanism (e.g., a prong mechanism, such as a feature on the example substance refill container that interfaces physically and mechanically with a receiving interface, potentially allowing for sensing by pressure, by light, by electrical connectivity or other means, etc.) for indicating print substance amount (e.g., in terms of mass or volume). In another example, an example print substance refill container may comprise an electrical mechanism for conveying information regarding print substance amount. For example, the print substance refill container may comprise a memory in which signals or states may be stored indicative of print substance amount stored in the refill container. The signals or states may be fetched to determine how much print substance is contained in the refill container. In another example, the identification feature may comprise an optically-read identifier, such as a bar code or QR code, by way of non-limiting example, that may be read to determine an amount of print substance stored within the print substance refill container. In yet another example, the identification feature may comprise an identifier marking that may be manually entered by a user, such as including a serial number. Other example methods of determining an amount of print substance introduced into a container may be used, including, but not limited to, a combination of the foregoing examples.

For example, in the case of a refill container with signals stored in a memory, the signals may be fetched and may be indicative of a mass or volume of print substance stored in the refill container (e.g., refill container contains 500 g of print substance X). Likewise, in a case of an identification feature such as a QR code, the identification feature may be identified (e.g., scanned by device 100 or a user) and a correspondence may be made to a mass or volume, by way of example (e.g., refill container recognized as refill container XYZ having a print substance mass of Y).

At block 225 of example method 200, a processor, such as processor 102 of device 100 in FIG. 1, may execute instructions to use the determined amount of print substance introduced to predict a print substance EOL. For example, using the amount of print substance determined to have been introduced at block 220, a determination may be made as to a number of pages that may be printed (referred to herein as a number of pages printable) using the introduced print substance. As noted, a number of characteristics of the print substance may influence a number of pages that may be printed per unit mass/volume of a given print substance. In some example cases, for instance, a calculation may be made using an amount of print substance introduced in order to yield a number of pages printable (e.g., based on a testing methodology established by a standards organization). In an alternative case, a memory may be consulted, such as containing a lookup table, to determine a number of pages printable based on an amount of print substance introduced. For instance, X1 grams of print substance may correspond to Y1 pages printable in some cases. In another case, X2 grams of print substance may correspond to Y2 pages printable. In yet another case, an amount of print substance may correspond to a yield value, a number of dots, or other like measure that may be used to determine a number of pages printable. Such yields may be determined consistent with the ISO/IEC 19752 testing guidelines, by way of non-limiting example.

In some implementations, the number of pages printable for introduced print substance may be added to a number of pages printable for remaining print substance in container 104 prior to refill. In another case, due for instance, to a relative difference between the remaining number of pages printable before refill (e.g., which might be on the order of tens or hundreds) and the number of pages printable due to refill print substance introduced (e.g., which might be on the order of thousands or tens of thousands), the device may instead use the number of pages printable based on the refill print substance introduced. Whatever the particular approach that might be taken to predict print substance EOL (e.g., determine a number of pages printable), the device (e.g., example device 100 of FIG. 1) may transmit signals indicative of the determined number of pages printable, such as shown at block 230 of FIG. 2. For example, signals indicative of the determined number of pages printable may be transmitted, such as for storage in a memory of container 104, to a display of a device, a connected computing device, a server on a private or public network, etc. In a case in which print substance is automatically transmitted to refill print devices (e.g., based on consumption of print substance), a server may periodically receive signals indicative of a determined number of pages printable. Based on those signals, refill print substance may be sent to enable print substance refill of device 100, such as to avoid down time. It may be desirable, therefore, as indicated at block 230, to transmit signals indicative of a number of pages printable.

Figure 3:
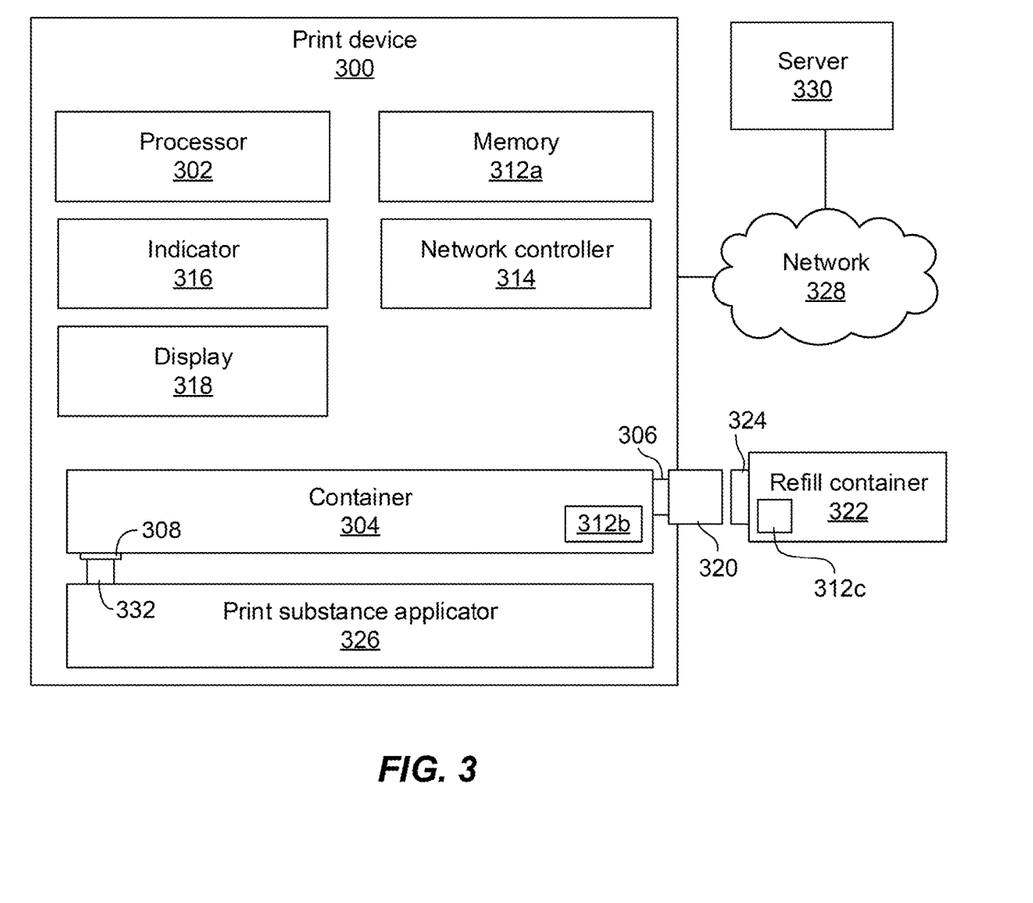
FIG. 3 is a block diagram of an example print device.

Another implementation for predicting print substance EOL is shown in FIG. 3. Example print device 300 may comprise a number of components that may be similar or analogous to those of example device 100 illustrated in FIG. 1. For instance, print device 300 may comprise a processor 302 and a container 304. Container 304 may comprise a refill port 306 (e.g., similar to refill port 106 in FIG. 1) and a conveyance port 308. Refill port 306 and/or conveyance port 308 may be in the form of an opening in container 304, may comprise a physical structure extending out of container 304 (e.g., a mouth or neck), and/or may be integrated into container 304 (e.g., forming unitary components) or may be discrete from container 304 (e.g., forming an attachable/detachable component), by way of non-limiting example. Example print device 300 may also comprise a refill interface 320 connected to refill port 306. Refill interface 320 may comprise mechanical and/or electrical elements, such as to facilitate authentication of print substance and/or determination of amounts of print substance introduced to container 304. For instance, in cases in which refill container 322 comprises a memory (e.g., memory 312c), refill interface 320 may comprise circuitry to receive signals indicative of amounts of print substance from memory 312c and/or signals indicative of authenticity of print substance, by way of example. In cases in which refill container 322 comprises other identification features 324, such as mechanical identification features (e.g., a prong or other structural element), refill interface 320 may comprise mechanical elements that may interact with the identification features of refill container 322. For instance, in some cases, refill container 322 may comprise an identification feature 324 including a particular pattern or shape of mechanical elements, such as a prong. The identification feature 324 may interact with refill interface 320 (e.g., the prong may interact with a trigger of refill interface 320) to indicate an authenticity of print substance and/or an amount of print substance contained within refill container 322, by way of example. For instance, refill interface 320 may comprise a plurality of triggers, and a particular trigger activated by identification feature 324 may provide an indication of an authenticity and/or an amount of print substance contained in refill container 322. A combination of mechanical and electrical elements may be used to determine print substance authenticity and/or an amount of print substance contained in refill container 322. For instance, in some example cases, an indicator of authenticity may be provided using an electrical element, while an amount of print substance introduced may be provided using a mechanical element, Etc. It is noted that while illustrated as distinct components, refill interface 320 and refill port 306 may be a unitary component in some implementations.

There may be a desire to store a number of pages printable on container 304, such as to allow container 304 to be removed from print device 300 and installed in a different print device while still being able to provide a number of pages printable to the different device. Thus, in some implementations, container 304 may also comprise a memory 312b, which may be capable of storing a number of pages printable or other measure of print substance EOL predictions (e.g., dot or pixel count predictions). For example, upon a determination of a number of pages printable, the value may be stored in memory 312b. The number of pages printable stored in memory 312b may be updated periodically or continually, for example.

Example print device 300 may also comprise a print substance applicator 326. In some cases, for instance, print device 300 may form a latent image on a photoconductive element and subsequently transmit print substance, such as in the form of the latent image on the photoconductive element, to a print substrate. The collection of components used to form an image on a substrate may be represented by print substance applicator 326. In another case, for instance, print device 300 may apply print substance directly to a print substrate, such as by depositing a number of dots of print substance. Again, in this case, the collection of components to enable depositing dots of fluid print substance on a substrate may be represented by print substance applicator 326. Of course, other methods of applying print substance are contemplated by claimed subject matter and may be enabled using different variations of print substance applicator 326. Whatever the particular method, print substance may be conveyed via conveyance port 308 and conveyance channel 332 (which, similar to refill interface 320 and refill port 306 may comprise distinct or unitary components) to print substance applicator 326. For instance, in cases in which print substance comprises fluids, conveyance channel 332 may comprise a tube or other such structure via which fluids may be conveyed, such as using pressure, etc. In cases in which print substance comprises solids, conveyance channel 332 may also include conveying and/or agitating mechanisms, such as augers, to transmit print substance to print substance applicator 326. Etc.

Example print device 300 may comprise other components to facilitate authentication of a print substance, determination of an amount of print substance introduced, prediction of a print substance EOL (e.g., a number of pages printable) based on an amount of print substance introduced, etc. For instance, a memory 312a of print device 300 may be in communication (e.g., electrical communication, optical communication, etc.) with other components of print device 300 (e.g., such as via a bus) and may store instructions, data, and other such information to enable determinations such as those discussed above in relation to example method 200 (and also those to be discussed hereinafter in relation to FIGS. 4 and 5). Memory 312a (and also memory 312b and 312c) may comprise volatile and non-volatile memory such as RAM memory, flash memory, solid state memory, resistive memory, and magnetic memory by way of example.

Example print device 300 may also comprise an indicator 316. An indicator 316 may provide an indication that may be readable by a user, such as a human-readable indication. For example, one such indicator 316 may comprise a gas gauge-style indicator comprising an arm or needle that may move relative to markings to indicate a print substance EOL, such as in terms of a number of pages remaining. Another example indicator 316 may comprise lights (e.g., an array of LEDs) capable of indicating a number of pages printable, a number of pages used, etc. For instance, an array of lights may light up or turn off to demonstrate a range of possible pages printable values and/or a full or empty nature of a container. Thus, indicator 316 may enable notification of a number of pages printable and/or a state of a container of print substance (e.g., full, empty, etc.).

Example print device 300 may also comprise a display 318. Example displays may include LED displays, LCD displays, OLED displays, and projection displays, by way of non-limiting example. Display 318 may be capable of providing information to users, providing an interface with which users may be capable of interacting (e.g., a user interface (UI)), etc. Example information that display 318 may capable of providing may include information regarding a connection between print device 300 and an external device, such as server 330 (e.g., electrical connections, optical connections, RF connections, etc.). For example, display 318 may be capable of informing users that a connection exists between print device 300 and server 330 (such as via network 328), that a number of pages printable is transmitted from print device 300 to server 330 via the connection, etc. And in some cases, display 318 may be capable of displaying information received from server 330 via the connection. For example, display 318 may be capable of providing status information regarding refill print substance being sent in response to signals received at server 330 from print device 300. For instance, in a case in which print device 300 notifies server 330 of a low number of pages printable, server 330 may enable transmission of refill print substance for print device 300. Server 330 may also transmit signals to inform print device 300 of refill print substance, may provide reminders to introduce the refill print substance into container 304, and/or may provide instructions to facilitate such refilling of print substance, by way of example.

In some implementations, network controller 314 may enable transmission and reception of signals between server 330 and print device 300. Similar to other components of print device 300, network controller 314 may be in communication with processor 302, such as via a bus, to allow signals to be received from server 330, decoded by network controller 314, and transmitted to processor 302 for handling. Similarly, signals from processor 302 may be received at network controller 314 via a bus, encoded for transmission, and transmitted via network 328. Of course, these are but examples and other analogous components may be used to enable signal exchange without limitation.

With the foregoing example components in mind, an example print device 300 is described, including example operation thereof to enable prediction of print substance EOL. For instance, an example print device 300 may comprise a refill interface 320 and a container 304 to hold a print substance. Container 304 may comprise an input port, such as refill port 306, in communication with refill interface 320. Container 304 may also comprise an output port, such as conveyance port 308, via which print substance may be conveyed. Print device 300 may also comprise a processor 302 to receive signals indicative of authenticated print substance introduced to container 304 via refill interface 320. Processor 302 may also receive signals indicative of an amount of authenticated print substance introduced via refill port 306. The signals indicative of the amount of print substance introduced may be received via refill interface 320. Processor 302 may also determine, using the amount of authenticated print substance, a number of pages printable. For instance, processor 302 may determine a number of pages printable using an amount of authenticated print substance received via refill interface 320, and may also use a number of pages printable based on print substance remaining in container 304 prior to refill. The determined number of pages printable may be indicated via display 318. The determined number of pages printable may also (or alternatively) be indicated via indicator 316. Indicator 316 may comprise a human-readable gauge, for instance.

As noted above, in some implementations the signals indicative of the amount of print substance introduced may be representative of an amount of print substance measured in grams. A relationship between amounts of print substance measured in grams and numbers of pages printable may be used to determine a number of pages printable based on the amount of print substance introduced. In another implementation, an amount of print substance introduced to container 304 via refill interface 320 may be expressed in ml. And a relationship between ml of print substance and a number of pages printable may enable determination of a number of pages printable based on an amount of print substance introduced expressed in ml. Of course, other implementations are contemplated by claimed subject matter.

Figure 4:
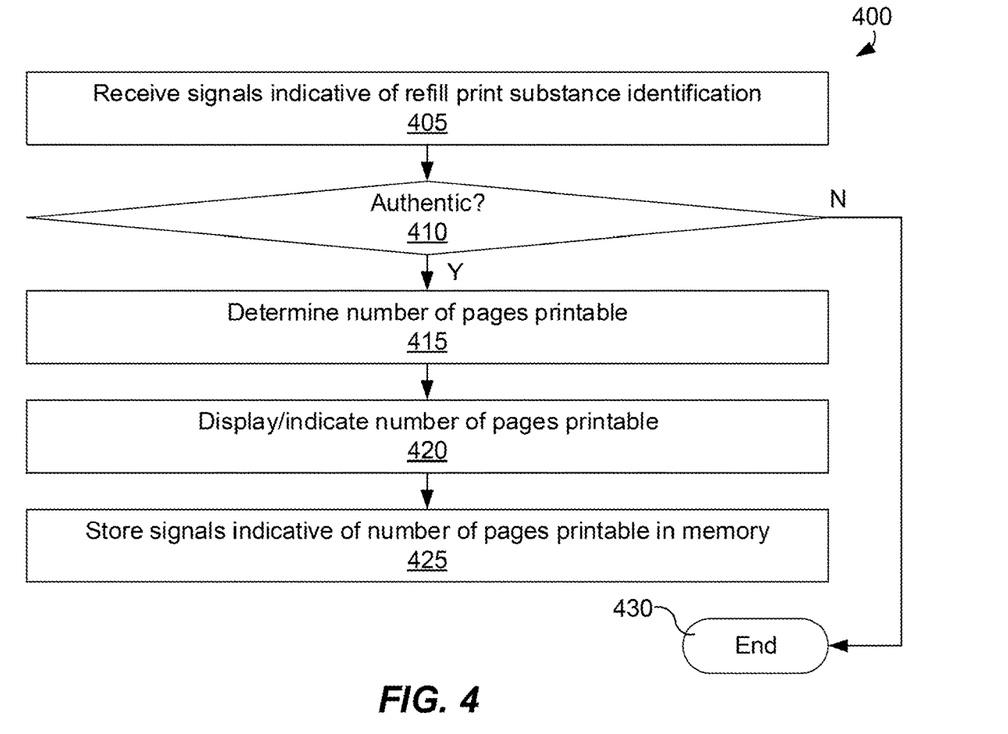
FIG. 4 is a flowchart for an example method for determining a number of pages printable.

Operation of example print device 300 can be described by reference to FIGS. 4 and 5. FIG. 4 illustrates an example method 400 for determining a number of pages printable based on an amount of introduced refill print substance. At example block 405, signals may be received indicative of refill print substance identification. For example, as shown in FIG. 3, an identification feature 324 may be used to enable determination of authenticity of print substance. In some cases, this may comprise identification of a print substance refill container 322. As noted, signals may be stored in a memory 312c of refill container 322 indicative of an identification. The stored signals may be fetched by print device 300 to determine an authenticity of the print substance. The identification may also be conveyed by markings, such as a physical pattern (bar code, QR code, etc.) or human-readable markings (e.g., a serial number), such as may be formed on refill container 322. Identification may also be conveyed by a physical shape of identification feature 324. Other approaches are also contemplated by claimed subject matter, and the foregoing examples are merely presented by way of example.

If it is determined that the refill print substance is not authentic, then, as shown by block 410, example method 400 may proceed to block 430, indicating an end. In some implementations, ending method 400 at block 430 may correspond to ceasing to provide pages printable predictions (see, e.g., the foregoing discussion of block 235 of FIG. 2). If, on the other hand, it is determined that the refill print substance is authentic, then method 400 may proceed to block 415, to determine a number of pages printable. As noted above, determining a number of pages printable may comprise determining an amount of print substance introduced. Thus, for instance, if it is determined that X grams of print substance is introduced via refill port 306, then a number of pages printable may be determined (e.g., based on a correspondence between grams of print substance and numbers of pages printable). For example, in some implementations, 500 g of print substance may yield approximately 20,000 pages printable, by way of non-limiting example.

At block 420, the determined number of pages printable may be displayed and/or indicated. For example, print device 300 of FIG. 3 may provide an indication of a number of pages using indicator 316, such as a human-readable gauge. In another example case, a number of pages printable may be displayed, such as using display 318.

At block 425, the number of pages printable may be stored, such as in memory 312b of FIG. 3.

Figure 5:
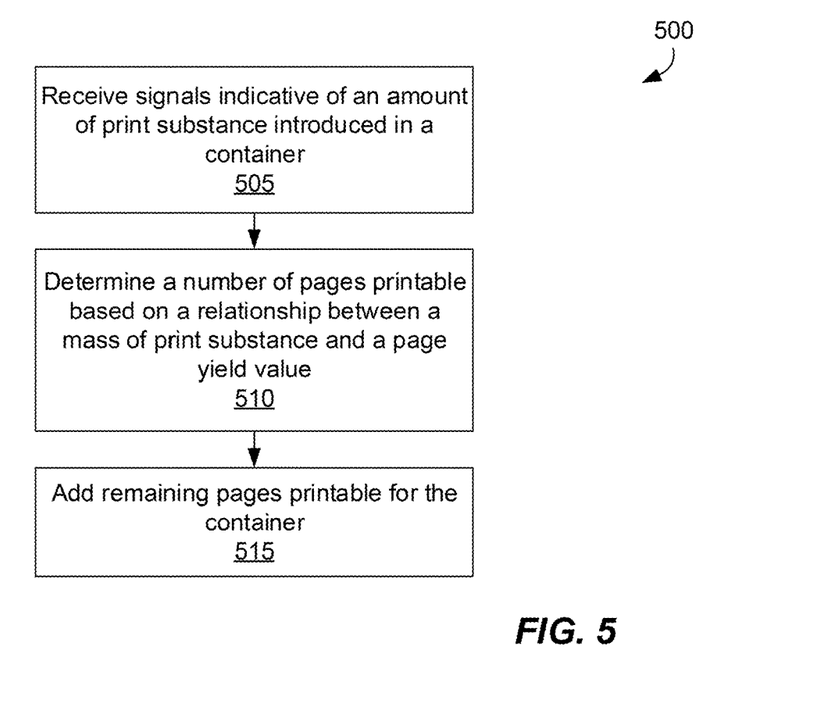
FIG. 5 is flowchart for an example method for determining a number of pages printable.

Moving on to FIG. 5, an example method 500 illustrates additional aspects of operation of example print device 300, such as for determining a number of pages printable. For instance, as shown at block 505, a print device, such as print device 300 of FIG. 3, may be capable of receiving signals indicative of an amount of print substance introduced to a container. For example, refill interface 320 and refill port 306 may enable a determination of an amount of print substance introduced to container 304. In some cases, for example, signals indicative of an amount of print substance introduced to container 304 may be sent to processor 302.

At block 510, a number of pages printable may be determined based on the amount of print substance introduced. For example, if the signals indicative of the amount of print substance introduced are representative of an amount of print substance measured in grams, the number of pages printable may be determined based on a relationship between grams of print substance introduced and numbers of pages printable. Etc.

At block 515, the determined number of pages printable based on the introduced refill print substance may be added to a remaining number of pages printable for the container. For example, if it is predicted that 1000 pages printable remain prior to refill, and an amount of print substance introduced corresponds to 10,000 pages printable, then, as illustrated at block 515, 11,000 pages may be determined to be a total print substance EOL prediction. As noted above, this value may be stored to memory 312b, may be transmitted to indicator 316, may be transmitted to server 330, etc.

In view of the foregoing, then, an amount of print substance introduced to a container may be used to predict a print substance EOL, such as in terms of a number of pages printable.

What is claimed is:

1. A device comprising:
a processor;
a print substance applicator;
a container to contain print substance, the container including a refill port; and
a refill interface connected to the refill port, the refill interface to:
connect to a refill container to receive print substance from the refill container;
interact with an identification feature of the refill container, the identification feature indicating an amount of print substance received; and
provide a signal indicating the amount of print substance received from the refill container to the processor,
wherein the processor is to predict a print substance end-of-life (EOL) based on the provided signal.

2. The device of claim 1, wherein the refill interface includes a trigger to interact with the identification feature of the refill container.

3. The device of claim 2, wherein the refill interface includes a plurality of triggers to interact with the identification feature of the refill container, each of the plurality of triggers corresponding to an authentication of the print substance received from the refill container or the amount of the print substance received from the refill container.

4. The device of claim 1, wherein the refill interface is to interact with the identification feature using pressure, light, or electrical connectivity.

5. The device of claim 1, wherein the processor is further to determine whether the print substance received from the refill container comprises authenticated print substance.

6. The device of claim 5, wherein the processor is further to disable prediction of the print substance EOL based on a determination that the print substance received from the refill container comprises unauthenticated print sub stance.

7. The device of claim 5, wherein the processor is further to determine whether the print substance received from the refill container comprises authenticated print substance based on a physical feature of the refill container or an identification marking of the refill container.

8. The device of claim 7, wherein the identification marking includes an identification number, a serial number, a barcode, or a quick response code.

9. The device of claim 1, wherein the processor is to predict the print substance EOL by determining a number of pages printable and wherein the processor is further to transmit the determined number of pages printable.

10. The device of claim 9, further comprising a display to indicate the determined number of pages printable.

11. The device of claim 9, further comprising a human-readable gauge to indicate the determined number of pages printable.

12. The device of claim 1,
wherein the identification feature indicating the amount of print substance received is representative of an amount of print substance measured in grams, and
wherein the processor is to predict the print substance EOL by determining a relationship between grams of print substance and numbers of pages printable.

13. The device of claim 1, further comprising a memory arranged on the container, wherein the processor is further to store a signal indicative of the predicted print substance EOL in the memory.

14. The device of claim 1, wherein the processor is further to predict the print substance EOL based on the amount of print substance received and based on an amount of print substance remaining in the container prior to the receiving of the print substance from the refill container.

15. A print device comprising:
a refill interface to interact with an identification feature of a refill container and to receive a print substance from the refill container;
a container to hold the print substance, wherein the container comprises an input port connected to the refill interface; and
a processor to:
receive a first signal from the refill interface to enable authentication of the print substance introduced to the container via the refill interface;
receive a second signal from the refill interface indicative of an amount of the authenticated print substance introduced via the refill interface; and
determine, based on the received second signal, a number of pages printable by the print substance in the container,
wherein the first signal and the second signal are provided by the refill interface based on the interaction with the identification feature of the refill container.

16. The print device of claim 15 further comprising a network controller to transmit the determined number of pages printable by the print substance to an external device.

17. The print device of claim 15, wherein the processor is further to determine the number of pages printable by the print substance in the container based on a relationship between print substance amounts and numbers of pages printable by print substance.

18. A non-volatile computer readable memory having stored thereon instructions to predict a print substance end-of-life (EOL) based on an amount of print substance received by a print device from a refill container, the non-volatile computer readable memory comprising:
instructions to determine whether a first signal received from a refill interface of the print device indicates that the received print substance comprises an authenticated print substance, the first signal based on an interaction of the refill interface with an identification feature of the refill container;
instructions to, in response to a determination that the received print substance comprises the authenticated print substance, determine the amount of the print substance received based a second signal received from the refill interface, the second signal based on the interaction of the refill interface with the identification feature of the refill container; and
instructions to determine a number of pages printable based on the determined amount of the print substance received.

19. The non-volatile computer readable memory of claim 18, further comprising instructions to transmit a signal indicative of the number of pages printable to an external device.

20. The non-volatile computer readable memory of claim 18, further comprising instructions to store a signal indicative of the number of pages printable to a memory of the print device.

* * * * *